C. W. Saladee,
Churn.
No. 85,967.   Patented Jan. 19, 1869.
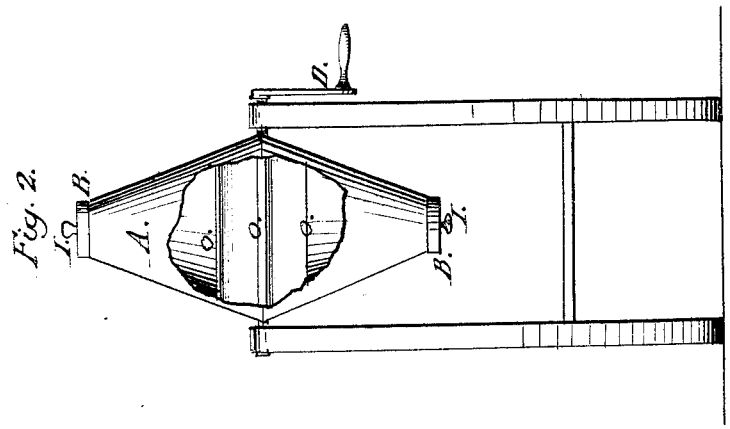
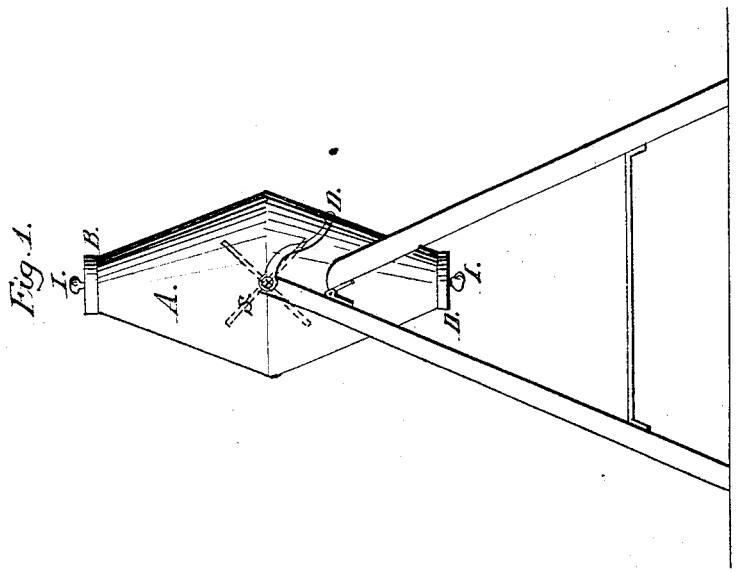
Witnesses:
Wm Stewart
J. G. Clayton
Inventor:
Cyrus W. Saladee

United States Patent Office.

CYRUS W. SALADEE, OF NEWARK, OHIO.

Letters Patent No. 85,967, dated January 19, 1869.

IMPROVEMENT IN CHURNS.

The Schedule referred to in these Letters Patent and making part of the same.

*To all whom it may concern:*

Be it known that I, CYRUS W. SALADEE, of Newark, county of Licking, State of Ohio, have invented a new and improved Mode of Constructing Churns; and I do hereby declare that the following is a full and exact description thereof, reference being had to the accompanying drawings, and to the letters of reference marked thereon.

The nature of my invention consists in the peculiar construction of a churn for the manufacture of butter by a new method.

I propose separating butter from new milk or cream by the use of a certain proportion of tartaric acid, carbonate of soda, pulverized alum, common salt, and ready-made butter, and for which purpose I use a hermetically-sealed churn, constructed and operating substantially as follows.

I propose to make these churns from heavy plate-tin, wood, or other suitable material, of a form substantially as shown in the drawings, each end of which is provided with the opening formed by rims B B, into which I fit a suitable cap, which is tightened by means of a set-screw, I, or in any other manner that will make the churn air-tight.

Across the centre of the churn is arranged the double V-shaped dash O O O, seen in section in Figure 2.

This dash is rigidly secured across the centre and by the sides of the churn A, so that, when the churn is revolved upon the centre S by the crank D, the milk or cream is broken over this dash as it falls from one end to the other. I will here state that this dash O O O may be made so as to swing loose upon the crank-rod passing through the centre of the churn.

Having thus fully described the object and nature of my invention,

What I claim as new, and desire to secure by Letters Patent, is—

The double V-shaped dash O O O, in the manner and for the purpose substantially as shown and described.

CYRUS W. SALADEE.

Witnesses:
 JOHN ARMSTRONG,
 ELIZA A. SALADEE.